(12) United States Patent
Tanaka et al.

(10) Patent No.: US 7,899,567 B2
(45) Date of Patent: Mar. 1, 2011

(54) METHOD AND PROGRAM FOR SELECTING PRODUCT TO BE INSPECTED

(75) Inventors: Masataka Tanaka, Fujisawa (JP);
Takaaki Kumazawa, Chigasaki (JP);
Masayuki Ichinohe, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 303 days.

(21) Appl. No.: 12/109,769

(22) Filed: Apr. 25, 2008

(65) Prior Publication Data

US 2008/0269936 A1 Oct. 30, 2008

(30) Foreign Application Priority Data

Apr. 27, 2007 (JP) .............................. 2007-117957

(51) Int. Cl.
*G06F 19/00* (2006.01)
*G01N 37/00* (2006.01)
(52) U.S. Cl. ........................................ 700/109; 702/83
(58) Field of Classification Search ................. 700/108, 700/109, 110; 702/83
See application file for complete search history.

(56) References Cited

U.S. PATENT DOCUMENTS

| 6,236,901 | B1 | 5/2001 | Goss |
| 2002/0029118 | A1 | 3/2002 | Yanaru et al. |
| 2004/0225396 | A1 | 11/2004 | Maeritz et al. |
| 2004/0236528 | A1 | 11/2004 | Steinkirchner et al. |
| 2006/0178767 | A1 * | 8/2006 | Lee et al. ..................... 700/109 |

FOREIGN PATENT DOCUMENTS

| EP | 1420310 A2 | 5/2004 |
| EP | 1420312 A2 | 5/2004 |
| JP | 9-269294 | 10/1997 |
| JP | 2004363288 | 12/2004 |

OTHER PUBLICATIONS

SAP AG, "Production lot planning / individual project plann" manual, Apr. 2001, SAP AG, Release 4.6C.*
SAP AG, "Inspection Lot Creation (QM-IM-IL)" manual, Apr. 2001, SAP AG, Release 4.6C.*
Graf, David A., et al, "Inspection-Planning Development: An Evolutionary Approach Using Reliability Engineering as a Tool", Reliability and Maintainability Symposium, 1994, Anaheim, CA, IEEE, Jan. 24, 1994, pp. 342-348.

* cited by examiner

*Primary Examiner*—Ryan A Jarrett
(74) *Attorney, Agent, or Firm*—Mattingly & Malur, P.C.

(57) ABSTRACT

An inspection-required product selection method and program for minimizing the number of investigation steps at the time of a defect occurrence for a product placed on the market are disclosed. A combination of product lots to be inspected is assumed based on the information on the material lots used for a product lot scheduled for production for a predetermined future period and the number of the product lots inspected during the same period. The number of the material lots not included in the product lots to be inspected is totalized for each product lot, and the statistical values are calculated for all the conceivable combinations of the product lots. The combination of the product lots optimizing the statistical values is selected for inspection.

4 Claims, 11 Drawing Sheets

FIG. 4

| CUSTOMER NAME | PRODUCT NAME | AMOUNT | PRODUCT UNIT | DELIVERY TIME |
|---|---|---|---|---|
| X COMPANY | PRODUCT A | 2 | t | 2006/05/25 |
| Y COMPANY | PRODUCT A | 1 | t | 2006/05/27 |
| Z COMPANY | PRODUCT A | 3 | t | 2006/05/30 |
| ---- | ---- | ---- | ---- | ---- |

FIG. 5

| PRODUCT NAME | PRODUCTION AMOUNT | PRODUCT UNIT | MATERIAL NAME | AMOUNT USED | MATERIAL UNIT |
|---|---|---|---|---|---|
| PRODUCT A | 1 | t | MATERIAL 1 | 1000 | kg |
| PRODUCT A | 1 | t | MATERIAL 2 | 100 | kg |
| PRODUCT A | 1 | t | MATERIAL 3 | 10 | kg |
| ---- | ---- | ---- | ---- | ---- | ---- |

FIG. 6

| MATERIAL NAME | LOT | AMOUNT | MATERIAL UNIT | DELIVERY DATE |
|---|---|---|---|---|
| MATERIAL 1 | Lot 1 | 1000 | kg | 2006/04/20 |
| MATERIAL 1 | Lot 2 | 1000 | kg | 2006/04/25 |
| MATERIAL 1 | Lot 3 | 1000 | kg | 2006/04/30 |
| MATERIAL 1 | Lot 4 | 1000 | kg | 2006/05/05 |
| MATERIAL 1 | Lot 5 | 2000 | kg | 2006/05/10 |
| MATERIAL 2 | Lot 1 | 400 | kg | 2006/04/20 |
| MATERIAL 2 | Lot 2 | 400 | kg | 2006/04/30 |
| MATERIAL 3 | Lot 1 | 10 | kg | 2006/04/20 |
| MATERIAL 3 | Lot 2 | 40 | kg | 2006/04/25 |
| MATERIAL 3 | Lot 3 | 10 | kg | 2006/05/05 |
| ---- | ---- | ---- | ---- | ---- |

FIG. 7

| PRODUCT NAME | LOT | INSPECTION RESULT | INSPECTION DATE/HOUR | CHEMICAL SUBSTANCE CONTENT (mg) | | |
|---|---|---|---|---|---|---|
| | | | | Pb | Cd | --- |
| PRODUCT A | Lot a2 | PASSED | 2006/05/17 10:00 | 10 | 5 | --- |
| PRODUCT A | Lot a6 | PASSED | 2006/05/18 01:00 | 5 | 1 | --- |
| PRODUCT B | Lot b1 | FAILED | 2006/05/19 15:00 | 50 | 10 | --- |
| --- | --- | --- | --- | --- | --- | --- |

FIG. 8

| | | Lot 1 | Lot 2 | Lot 3 | Lot 4 | Lot 5 | |
|---|---|---|---|---|---|---|---|
| MATERIAL LOTS USED | LOT OF MATERIAL 1 | Lot 1 | Lot 2 | Lot 3 | Lot 4 | Lot 5 | |
| | LOT OF MATERIAL 2 | Lot 1 | Lot 2 | | | Lot 2 | |
| | LOT OF MATERIAL 3 | | | | | Lot 3 | |
| INFORMATION ON PRODUCTS TO BE PRODUCED | PRODUCT NAME | PRODUCT A | PRODUCT A | PRODUCT A | PRODUCT A | PRODUCT A | PRODUCT A |
| | PRODUCTION AMOUNT | 1 | 1 | 1 | 1 | 1 | 1 |
| | PRODUCT UNIT | t | t | t | t | t | t |
| | PRODUCT LOT | Lot a1 | Lot a2 | Lot a3 | Lot a4 | Lot a5 | Lot a6 |
| | PRODUCTION START DATE/ HOUR | 2006/05/15 11:00 | 2006/05/15 14:30 | 2006/05/15 18:00 | 2006/05/15 21:30 | 2006/05/16 00:00 | 2006/05/16 03:30 |

FIG. 10

■ INFORMATION ON PRODUCT PRODUCED

- PRODUCT NAME

| PRODUCT A |

- PRODUCTION PERIOD

| 2006/05/15/ 11:00 |

~ | 2006/05/16/ 03:30 |

- NUMBER OF PRODUCT LOTS

| 6 |

■ NUMBER OF PRODUCT LOTS INSPECTED

| 2 |

■ OPTIMIZATION CONDITIONS

PRIMARY OPTIMIZATION ITEM

- PARAMETER

| MAXIMUM VALUE ▼ |

- CRITERION

| MINIMUM VALUE ▼ |

SECONDARY OPTIMIZATION ITEM

- PARAMETER

| AVERAGE VALUE ▼ |

- CRITERION

| MINIMUM VALUE ▼ |

FIG. 12

| EQUIPMENT NAME: EQUIPMENT 2 | | |
|---|---|---|

EQUIPMENT NAME: EQUIPMENT 1

INFORMATION ON PRODUCT SAMPLED

| PRODUCT NAME | LOT | SCHEDULED PRODUCTION DATE/HOUR |
|---|---|---|
| PRODUCT A | Lot a2 | 2006/05/15 15:30 |
| PRODUCT A | Lot a6 | 2006/05/16 02:00 |

METHOD AND PROGRAM FOR SELECTING PRODUCT TO BE INSPECTED

BACKGROUND OF THE INVENTION

This invention relates to a method of selecting a product to be inspected and a program for selecting a product to be inspected by the product sampling inspection conducted in the product production process.

In a product such as a chemical product or plastic product produced through the process of mixing a plurality of materials, the characteristic values of the product functions and the content of the chemical substances in the product may be varied depending on the production conditions including the processing temperature and the processing time. Therefore, the quality of the product to be shipped is required to be secured by conducting product inspection during the production process. The method of the product inspection includes a total inspection and a sampling inspection. The total inspection is the one conducted on all the products produced (in all units of product lots, for example). In the sampling inspection, on the other hand, samples are picked out at predetermined intervals from the products flowing on the production line and inspected, and the result is used to represent the result of product inspection for the particular intervals.

The total inspection, though recommended for securing product quality, poses the problem that the inspection steps and the inspection cost are increased. For the products and materials of a quality stabilized to a certain degree, therefore, the sampling inspection is conducted.

The conventional sampling inspection, as described in JP-A-9-269294, is conducted for each predetermined number of products or product lots at an optimum frequency set according to the balance between the product quality to be secured and the inspection cost. The (product) lot is defined as a group of products processed at the same time in each production process. According to this technique, the amount of the loss incurred as the result of overlooking a defect for a predetermined inspection frequency is estimated using the relation between the rate at which a product defect is detected by an inspection device and the frequency at which a product defect occurs, and the inspection frequency is optimized in such a manner as to minimize the sum of the loss amount and the inspection cost required for the inspection conducted at the particular frequency.

The result of this product inspection is utilized to investigate the cause of the defect as well as to secure the product quality as described below. A product defect is considered to be caused either by the material used for production (hereinafter referred to as "the material-derived defect") or by the production equipment or the production conditions (hereinafter referred to as "the production-derived defect").

A material-derived defect is investigated by measuring the amount of the chemical substances, for example, contained in a sample of a material lot used in the defective product. In an anomalous case where the investigation result indicates that the amount of a chemical substance is larger than a specified value, the particular material lot is determined as the cause of the defect, and the shipment of the other products produced from the particular material lot is suspended or the products are recalled. A production-derived defect, on the other hand, is investigated by checking whether the production history of the equipment, etc. used in the production of the defective product is anomalous or not. The "production history" is defined as the chronologically recorded information including the materials used for production in a particular piece of equipment, the lots of a product in process and the production conditions such as the processing temperature and the processing time.

The investigation of a material-derived defect is a time-consuming job requiring the preparation of an analysis sample and the waiting time before reaction. In view of this, a material lot used for a product lot is not investigated as long as the particular product is found not to be defective by the sampling inspection conducted during the production, on the assumption that the possibility is low that the particular material lot causes the defect even in the case where the particular product is found defective after shipment.

The conventional sampling inspection method used for this investigation of the cause of the defect poses the problem described below.

In the case where a product is found defective after being shipped, it is important to specify the cause of the defect quickly. A product lot having a smaller number of material lots requiring the investigation (hereinafter sometimes referred to as the investigation-required material lots) at the time of defect occurrence requires a correspondingly smaller number of steps to trace the cause of the defect, and therefore, the cause of such a defect can be specified at an early time. In the sampling inspection of a product in the production process, therefore, it is important to select a product lot requiring the inspection (hereinafter sometimes referred to as the inspection-required product lot) in such a manner as to minimize the material lots to be investigated at the time of defect occurrence.

The conventional inspection method in which product lots are sampled at predetermined intervals, however, fails to take the material lots used for the product into consideration, and therefore, poses the problem that a multiplicity of material lots may be required to be investigated at the time of defect occurrence.

SUMMARY OF THE INVENTION

Accordingly, it is an object of this invention to provide a method of selecting a product to be inspected and a system for selecting a product to be inspected, which reduces the number of investigation steps to be followed at the time of defect occurrence without increasing the inspection frequency.

According to this invention, there is provided a method of selecting an inspection-required product lot in the production process of the product, in which the combination of the inspection-required products is optimized thereby to reduce the number of steps executed for investigating the cause of the defect occurrence. First, an inspection-required product lot is assumed from the information on the allotment of material lots to the product lots scheduled for production for a given future period and the number of the product lots inspected for the particular period. Next, based on the material lots to be used for the inspection-required product and the allotment information described above, the number of the investigation-required material lots at the time of the defect occurrence is totalized for each product lot, and thus, the statistical values (maximum value and average value) of the totalized values are calculated. These statistical values are calculated for all the conceivable combinations of the product lots, and a combination of the product lots optimizing the statistical values is extracted for inspection. By selecting an inspection-required product lot from the information on the allotment of material lots to a product lot scheduled for production in the above-mentioned way, the expectation value and the maximum value of the number of the material lots to be investigated at the time of defect occurrence can be controlled, and therefore, the number of investigation steps at the time of defect occurrence can be reduced while maintaining the same inspection frequency as the conventional sampling inspection.

According to this invention, an inspection-required product lot is selected in such a manner as to optimize the expectation value and the maximum value of the number of investigation-required material lots at the time of defect occurrence, and therefore, the number of investigation steps to be followed at the time of defect occurrence can be reduced while at the same time maintaining the same inspection frequency as in the conventional sampling inspection.

Other objects, features and advantages of the invention will become apparent from the following description of the embodiments of the invention taken in conjunction with the accompanying drawings.

BRIEF DESCRIPTION OF THE DRAWINGS

FIG. 4 is a diagram showing an example of the received order information.

FIG. 5 is a diagram showing an example of the design information.

FIG. 6 is a diagram showing an example of the stock information.

FIG. 7 is a diagram showing an example of the inspection result.

FIG. 8 is a diagram showing an example of the production plan information.

FIG. 10 is a diagram showing an example of an input screen.

FIG. 12 is a diagram showing an example of an inspection-required product lot displayed on the output screen.

DETAILED DESCRIPTION OF THE INVENTION

Embodiments of the present invention are explained in detail below.

Figure 1:
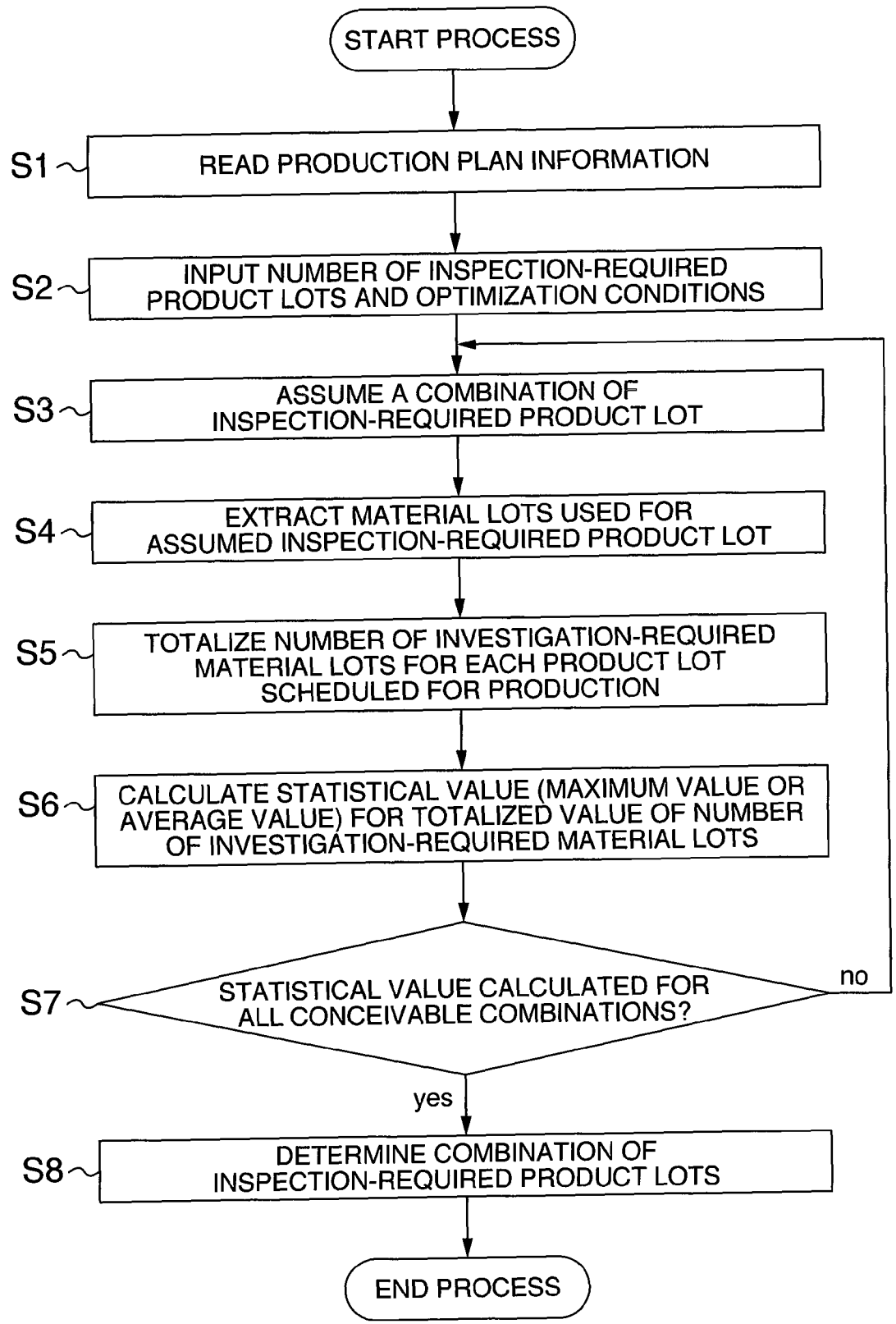
FIG. 1 is a flowchart showing the processing steps according to an embodiment of the invention.
Figure 2:
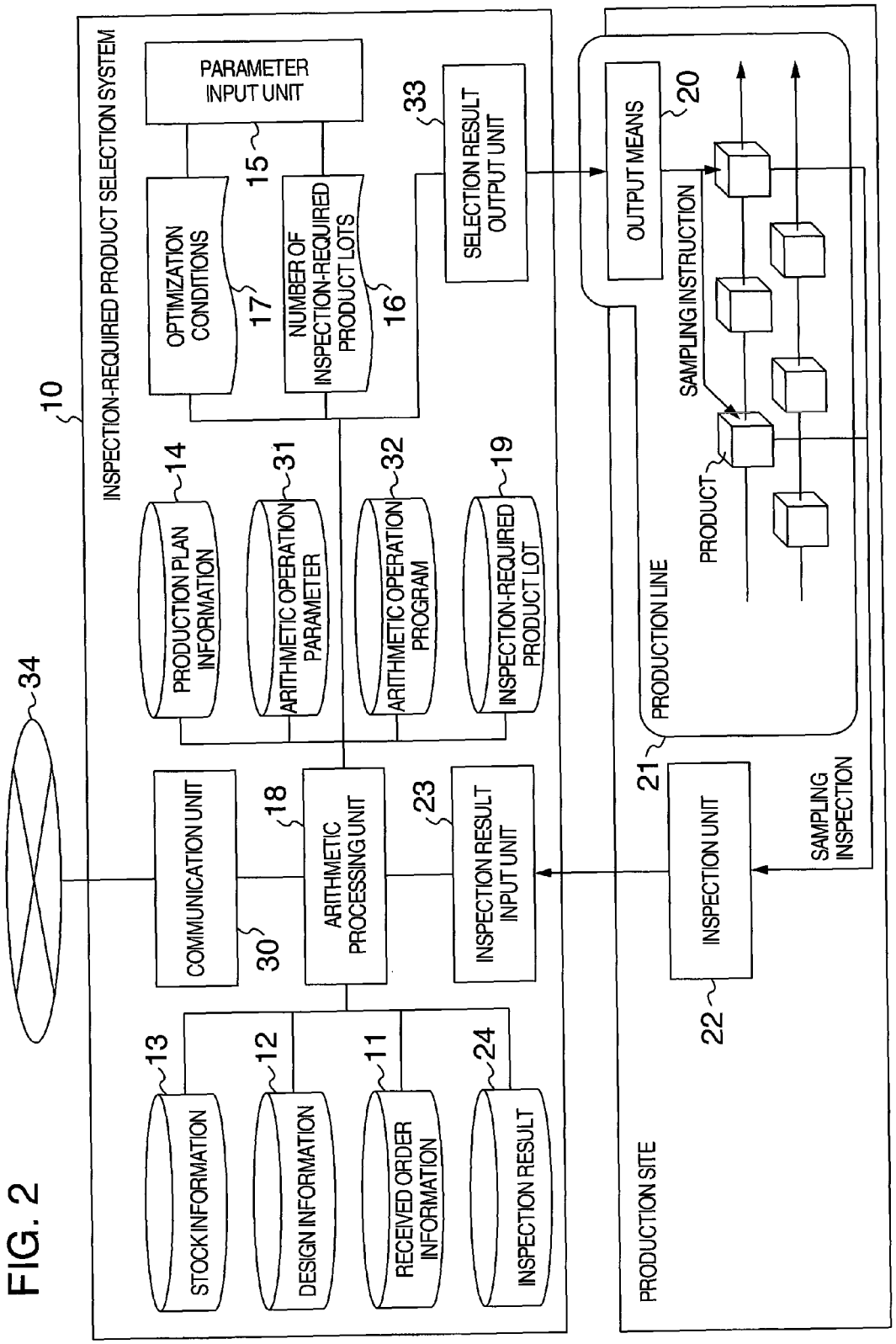
FIG. 2 is a block diagram showing the overall system configuration of the peripheral systems related to the invention.
Figure 3:
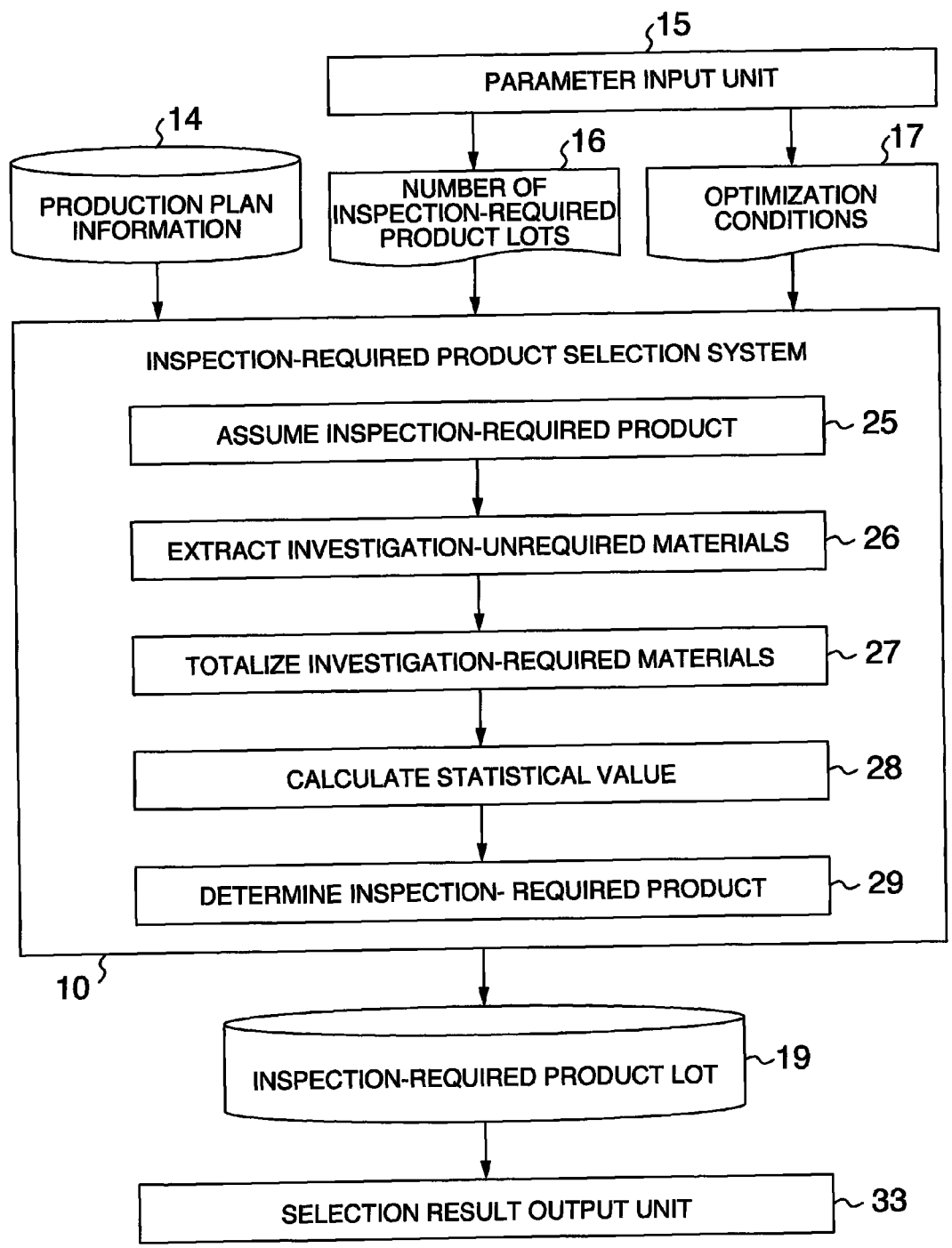
FIG. 3 is a diagram showing the functional configuration of an inspection-required product selection system.

FIG. 1 is a flowchart showing the processing steps of an inspection-required product selection system according to an embodiment of the invention. FIG. 2 is a function block diagram showing an overall system configuration including the peripheral systems related to this invention, and FIG. 3 is a diagram showing the functional configuration according to the invention.

An inspection-required product selection system 10 shown in FIG. 2 includes an arithmetic processing unit 18 for executing the process of determining an inspection-required product lot by loading an arithmetic program 32, a communication unit 30 for inputting the received order information 11, the design information 12 and the stock information 13 through a network 34, a parameter input unit 15 for inputting various parameters for arithmetic operation, a production plan information storage unit 14, an arithmetic parameter storage unit 31, an inspection-required product lot storage unit 19 for storing the selection result of an inspection-required product lot, an inspection result input unit 23 for inputting the sampling inspection result, an inspection result storage unit 24 and a selection result output unit 33.

Although the received order information 11, the design information 12 and the stock information 13 are input from external sources through a network in the system configuration shown in FIG. 2, these various information may be already constructed and stored internally in the case where the a production control system is included in the same system configuration.

The received order information 11 is the information on products ordered and customers that have ordered the products, and as shown in FIG. 4, includes the customer name, product name, amount, product unit and delivery time.

The design information 12 is the information on the materials used for producing a given product, and as shown in FIG. 5, includes the product name, production amount, product unit, material name, amount used and material unit. FIG. 5 shows an example of the design information for producing a product having the product name "product A" in an amount of 1 t (=1000 kg). In the actual production process, byproducts are generated, and therefore, the total amount of the materials used is larger than the production amount of the product as shown in FIG. 5.

The stock information 13 is the information on the material lots held in stock, and as shown in FIG. 6, includes the information on the material name, lot, amount, material unit and the delivery date.

The production plan information 14 is the result of allotting the material lots to the product lots scheduled to be produced for a predetermined future period, and prepared based on the received order information 11, the design information 12 and the stock information 13.

The parameter input unit 15 is configured of an input unit such as a keyboard or a mouse and a display unit, and used by the user to input an inspectable product lot number 16 and optimization conditions 17 to the inspection-required product selection system 10. The inspectable product lot number 16 is the number of the product lots that can be inspected during the period estimated at the time of preparing the production plan information 14, and determined by the user based on the time and cost consumed per inspection session and the budget available for the inspection during the particular period. The optimization conditions 17 are the information used to determine the optimum inspection-required product lot 19 and configured of the parameters and the criterion for the optimum value of the number of the material lots to be investigated at the time of defect occurrence. For example, the statistical amount (maximum value or average value) of the number of the investigation-required material lots is set as a parameter and the maximum value (minimum value) of the statistical amount as a criterion. The inspection-required product lot 19 is a data base for accumulating the output result of the present system, i.e. the information on the product lots to be inspected for a given period of time.

The process in the inspection-required product selection system 10 is configured of the function 25 for assuming an inspection-required product, the function 26 for extracting the materials requiring no investigation, the function 27 for totalizing the number of the investigation-required materials, the function 28 for calculating the statistical values and the function 29 for determining an inspection-required product. The inspection-required product selection system 10 thus outputs the inspection-required product lot 19 in response to the production plan information 14 and the inspectable product lot number 16 input thereto. Also, the inspection-required product selection system 10 can change the method of determining the inspection-required product lot 19 according to the optimization conditions 17. Each function of the inspection-required product selection system 10 is described in detail later.

In FIG. 2, the output means 20 is the display of the personal computer or the like installed on the production line 21 to display the inspection-required product lot 19.

On the production line 21 in FIG. 2, the product lot is sampled in accordance with the information on the inspection-required product lot 10 displayed on the output means 20.

The inspection unit 22 inspects the product lot sampled out from the production line 21 in the aforementioned way.

The inspection result input unit 23 is configured of an input unit such as a keyboard or a mouse and a display unit, and operates in such a manner that the result 24 of the inspection conducted on each product lot by the inspection unit 22 is input to the inspection-required product selection system 10. In an alternative embodiment, the inspection result input unit 23 and the parameter input unit 15 may be one unit.

The inspection result 24 is the result of inspection made on each product lot input through the inspection result input unit 23, and as shown in FIG. 7, includes the information on the product name, lot, inspection result, inspection date/hour and the chemical substance content (the amount of the chemical substances such as Pd and Cd contained in the product).

Next, an explanation is given about a method of preparing the production plan information 14 used for the arithmetic operation in the inspection-required product selection system 10 shown in FIG. 3.

Figure 9:
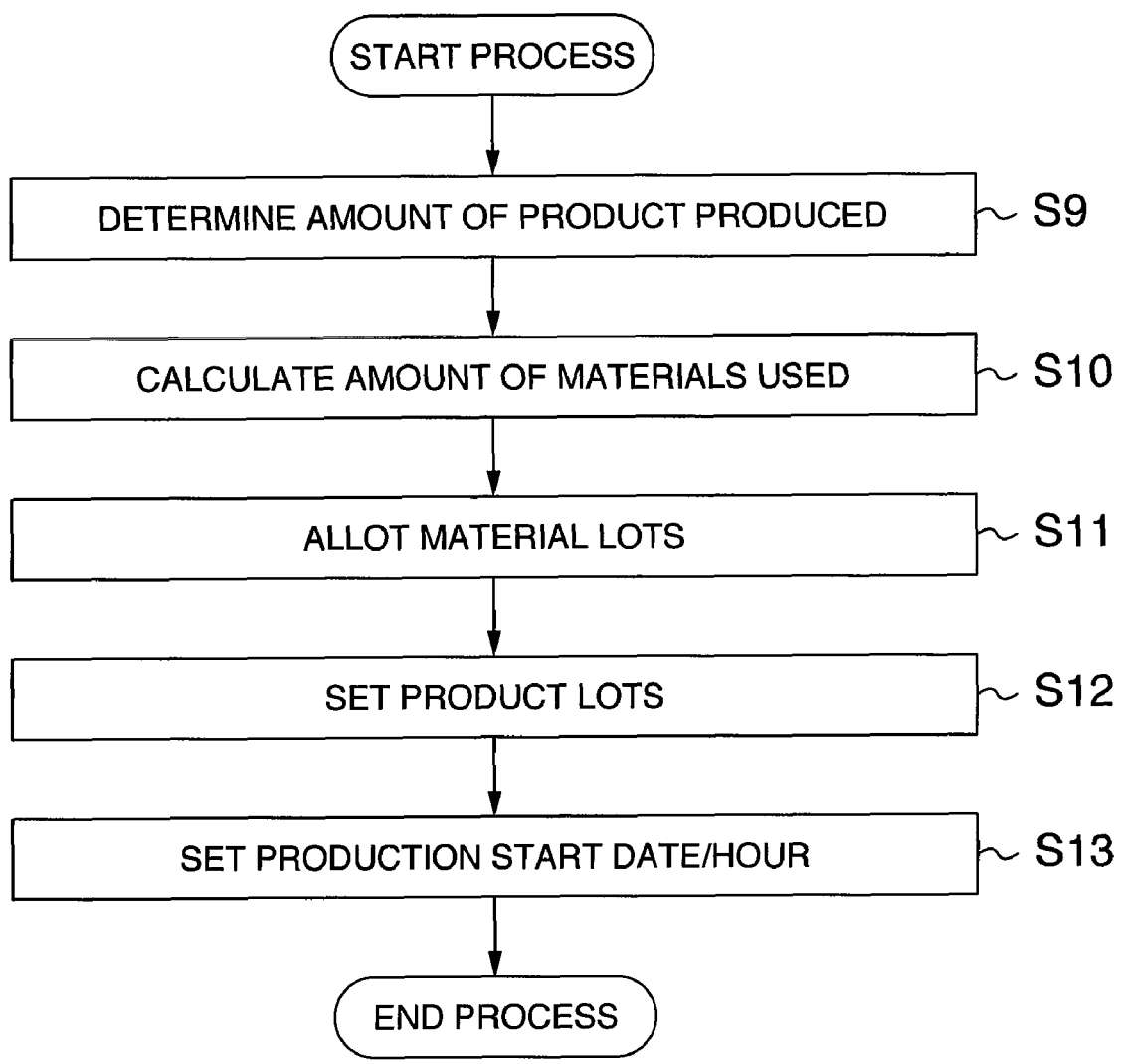
FIG. 9 is a flowchart showing a method of generating the production plan information.

The production plan information 14 is prepared from the received order information 11, the design information 12 and the stock information 13. The method of preparing the production plan information 14 is explained in detail below with reference to the flowchart of FIG. 9.

First, the amount of a product to be produced for a certain future period of time is determined based on the received order information (S9). In accordance with the orders received from X, Y and Z companies shown in FIG. 4, for example, assume that a plan is formed to produce the product A in the amount of 6 t (=2 t+1 t+3 t). Next, based on the design information 12, the amount of the materials required for the planned production of the product A is calculated (S10). In accordance with the design information 12 shown in FIG. 5, for example, the amounts of the materials 1, 2 and 3 required to produce 6 t of the product A are calculated as 6000 kg, 600 kg and 60 kg, respectively. Next, the material lots used for this period (the period during which 6 t of the product A is produced) are allotted to the product lots according to a predetermined production rule (S11). Assume, for example, that the materials delivered at an earlier delivery data are used first and that the product lot of the product A is produced in units of 1 t. Also assume that the material lots in stock shown in FIG. 6 are allotted for production of 6 t of the product A. First, Lot 1 (1000 kg) of the material 1, Lot 1 (100 kg) of the material 2 and Lot 1 (10 kg) of the material 3 having the oldest delivery date of Apr. 20, 2006 are allotted for the production of 1 t of the product A. Lot 1 of the materials 1 and 3 are used up. Therefore, Lot 2 (1000 kg) of the material 1, Lot 2 (10 kg) of the material 3 and Lot 1 (100 kg) of the material 2 still remaining in stock having the next oldest delivery date of Apr. 25, 2006 are allotted for the production of the next 1 t of the product A. In similar fashion, the material lots used for the production of 6 t of the product A continue to be allotted. Then, the result as shown in FIG. 8 is obtained. Further, taking the occupation and production capacity of the production facility and the order backlog into account, the product lots and the production start date/hour of each product lot are set (S12, S13). The production plan information shown in FIG. 8 is stored in the production plan information storage unit 14.

The correspondence between the product lots and the material lots shown in FIG. 8 shows an example in which the one-to-one relation is maintained between each product lot and each material lot. This invention is also applicable, however, to a case in which a plurality of lots of a given material are used for production of a given product lot. In other words, one material may be a mixture of a plurality of material lots.

Next, with reference to the flowchart of FIG. 1, the operation of each function in the inspection-required product selection system 10 shown in FIG. 3 is explained.

The inspection-required product selection system 10 reads the production plan information 14 prepared by the aforementioned procedure and displays the production-planned product information in the production plan information on the parameter input unit 15 (S1). The production-planned product information is defined as the number of product lots scheduled to be produced for a predetermined future period. In the case where the production plan information 14 of the product A shown in FIG. 8 is read, for example, the product name, production period and the number of the product lots shown in FIG. 10 are displayed.

Next, the user inputs the inspectable product lot number 16 and the optimization conditions 17 from the parameter input unit 15. The inspectable product lot number 16 is determined and input by the user based on the production period and the number of the product lots displayed on the parameter input unit 15 and the time and cost required for the product inspection. Also, the parameters and the criterion for determining the inspection-required product lot are input as the optimization conditions 17 (S2). A plurality of parameters and criteria including the primary optimization item and the secondary optimization item can be set. In accordance with the display screen of FIG. 10, the inspectable product lot number and the optimization conditions 17 input by the user are stored in the arithmetic parameter storage unit 31.

Figure 11:
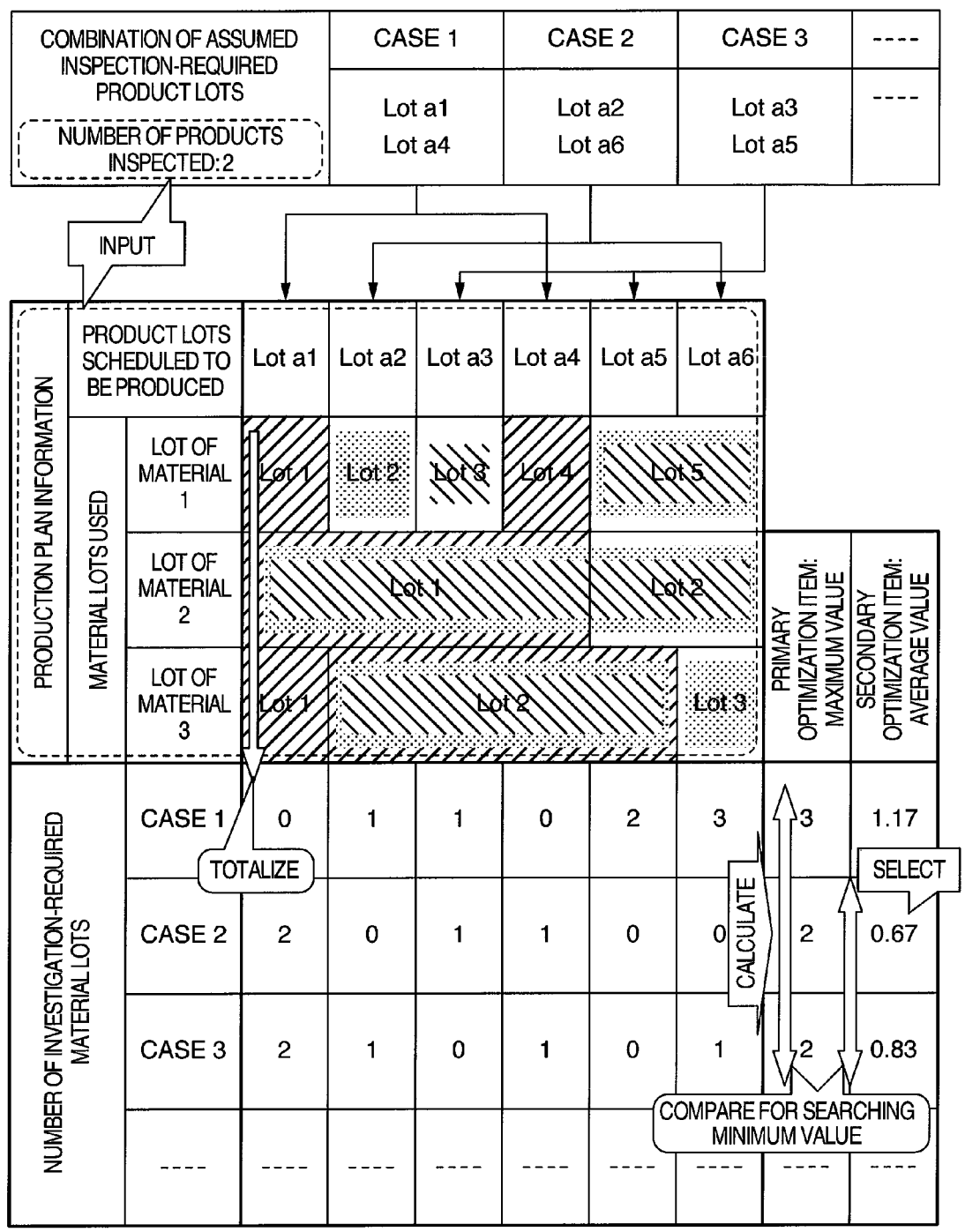
FIG. 11 is a diagram showing an example of the processing result of the inspection-required product selection system.

FIG. 11 is a diagram showing an example of the processing result of the inspection-required product selection system 10, in which the production plan information 14 shown in FIG. 8 is read, and "2" is input as the inspectable product lot number 16, while in terms of the optimization conditions 17, "maximum value" is input as a parameter and "minimum value" as a criterion of the primary optimization item on the one hand, and "average value" is input as a parameter and "minimum value" as a criterion of the secondary optimization item on the other hand. The operation of each function of the inspection-required product selection system 10 is explained below with reference to FIGS. 1, 3 and 11.

Upon complete input of the aforementioned items by the user, the inspection-required product assumption function 25 assumes, from the product lots to be produced as described in the production plan information 14, combinations of the product lots to be produced in the inspectable product lot number 16 (S3). In FIG. 11, case 1 shows an example in which two lots, Lot a1 and Lot a4, are selected as inspection-required products from the product lots Lot a1 to Lot a6 to be produced.

Then, the function 26 of extracting the materials requiring no investigation (hereinafter referred to as the investigation-unrequired material extraction function 26) extracts the material lots to be used for the inspection-required product lots assumed above (S4). The material lots thus extracted are assumed to have a small chance of being defective as long as the corresponding product function is determined satisfactory by the product sampling inspection and, if used for other product lots, assumed to require no investigation at the time of defect occurrence. By determining the correlation between the number of the inspection-required product lots and the number of the investigation-unrequired material lots, therefore, the inspection-required product lots optimizing the number of the investigation steps at the time of defect occurrence are determined by the processing steps described below.

Assuming the inspection-required product lots as shown in case 1 of FIG. 11, the five material lots including Lot 1 and Lot 4 of the material 1, Lot 1 of the material 2 and Lot 1 and Lot 2 of the material 3 used for Lot a1 and Lot a4 of the corresponding product are extracted as investigation-unrequired material lots.

Next, the investigation-required material number totalization function 27 totalizes, for each product lot scheduled to be produced, the number of the material lots (hereinafter referred to as the "investigation-required material lots") not designated as the investigation-unrequired material lots by the investigation-unrequired material extraction function 26 (S5).

In the case where the inspection-required product lots are assumed as in case 1 of FIG. 11, all the materials used for Lot a1 require no investigation, and therefore, the number of the investigation-required material lots is zero. Also, Lot a2 uses Lot 2 of the material 1, Lot 1 of the material 2 and Lot 2 of the material 3. Of all of these materials, Lot 1 of the material 2 and Lot 2 of the material 3 are designated as investigation-unrequired material lots by the investigation-unrequired material extraction function 26, and therefore, the total number of the investigation-required material lot for Lot a2 is unity. In similar fashion, the total number of the investigation-required material lots is determined from the product lots Lot a3 to Lot a6 scheduled for production. Then, the values indicated on the row of case 1 in the "number of investigation-required material lots" column in FIG. 11 are obtained.

Further, the statistical value calculation function 28 calculates the statistical values (maximum value and average value) of the totalized number of the investigation-required material lots for each product lot scheduled for production (S6). In FIG. 11, the maximum total value indicated on the row of case 1 of the "number of the investigation-required material lots" column is given as 3 for the product lot Lot a6, and the average value thereof as (0+1+1+0+2+3)/6=1.17.

The aforementioned calculation of the statistical values is made for all conceivable combinations of the product lots. Specifically, in the case of FIG. 11, two product lots are selected as each combination out of six product lots, and therefore, combinations in the number of $_6C_2$, i.e. 15 (=(6×5)/(2×1)) can be conceived, and the process of steps S3 to S6 is repeated until the calculation of the aforementioned statistical values is finished for all of the 15 combination cases (S7).

After calculation of the number of the investigation-required material lots as described above, the inspection-required product determining function 29 determines the inspection-required product lots 19 based on the optimization conditions 17, and stores the determination result in the inspection-required product lot storage unit 19. Also, the same result is output to the output means 20 at the production site through the selection result output unit 33 (S8).

In FIG. 11, the columns of "primary optimization item" and "secondary optimization item" indicate the statistical values of the number of the investigation-required material lots, and the result of calculation by the method set under the optimization conditions on the input screen (FIG. 10). Specifically, the maximum value of the number of the investigation-required material lots is indicated as the primary optimization item and the average value thereof as the secondary optimization item. The inspection-required product lots are defined as the product lots included in the case minimizing the primary optimization item, and in the case where a plurality of cases exist satisfying the same conditions, a case having a smaller value of the secondary optimization item is selected.

According to the example shown in FIG. 11, the minimum primary optimization item is 2 for case 2 and case case 3. In the presence of two cases minimizing the primary optimization item, the secondary optimization item is checked. Since the secondary optimization item is 0.67 for case 2 and smaller than 0.83 for case 3. Therefore, Lot a2 and Lot a6 of case 2 are determined as the inspection-required product lots.

By minimizing the maximum value of the number of the investigation-required material lots, the risk of expanding the number of investigation steps upon defect occurrence can be avoided. Also, in the case where the average value of the number of the investigation-required material lots is minimized, the expectation value of the number of investigation steps can be minimized.

As described above, various advantages are obtained by the optimization parameters and the criteria. These values, therefore, should be selected freely by the user for a particular purpose.

The result determined as described above is output to the output means 20 installed on the production line and thus transmitted to the workers on the production line. FIG. 12 is a diagram showing an example of the output of the inspection-required product lots. The output means 20 is a display unit such as CRT or liquid crystal monitor, and outputs such information as the product names of the inspection-required products and the inspection-required product lots, and the equipment for producing the products and the scheduled production date/hour.

Although the example described in FIG. 11 indicates each material lot as a single unit for producing each product lot, the invention is applicable equally also to the production of a product lot by mixing a plurality of material lots. In such a case, assuming that the material lots Lot 1, Lot 2 and Lot 3 of the material 1 are used for Lot b1 of the product B, for example, the number of the investigation-required material lots is counted as 3. The other points are similar to the corresponding ones in the calculation method described above.

By selecting the inspection-required product lots according to the method described above, the investigation can be concentrated on the material lots having a high possibility as a cause of a product defect which may occur, and therefore, the cause of the defect can be traced at an early time.

It should be further understood by those skilled in the art that although the foregoing description has been made on embodiments of the invention, the invention is not limited thereto and various changes and modifications may be made without departing from the scope of the appended claims.

The invention claimed is:

1. A method of selecting inspection-required product lots for a sampling inspection during a production process to minimize an expectation value of the number of investigation steps for a defect-causing material lot at the time of defect occurrence of the product placed on the market, comprising the steps of:

determining an amount of the product produced during a scheduled future period based on received order information;

calculating from design information the amount of materials required for the product scheduled for production;

preparing production plan information in which material lots used for each material are allotted to each lot of product scheduled for production based on material stock information and in accordance with a predetermined allotment rule;

accessing a number of the product lots to be inspected during the scheduled production period, and a user input which has a selected maximum value or average value as a statistical primary organization value and a statistical secondary value of the number of investigation-required material lots for every product lot; and assuming all conceivable combinations of the product lots for the number of inspection-required product lots of all product lots; and further, with regard to each of the combinations;

extracting, as investigation-unrequired material lots, the material lots allotted to at least one the inspection-required product lots which are included in the combination;

totalizing, for each product lot scheduled for production, the number of the allotted material lots other than the investigation-unrequired material lots specified in the preceding step as the number of investigation-required material lots; and calculating the maximum value or the average value of the number of investigation-required material lots as a statistical primary optimization value and the average value or maximum value of the number of investigation-required material lots as a statistical secondary optimization value for the number of the investigation-required material lots totalized in the preceding step of totalizing;

the method further comprising:

selecting a combination of the product lots minimizing the statistical primary optimization value for the number of the investigation-required material lots for each product lot, as calculated for each of the combinations;

in the case where a plurality of corresponding combinations of the product lots are selected in the preceding step of selecting a combination of the product lots minimizing the statistical primary optimization value, further selecting a combination of the product lots for minimizing the statistical secondary optimization value among said plurality of corresponding combinations of the product lots; and in the case where only one combination of the product lots minimizing the statistical secondary optimization value is selected in the preceding step of further selecting a combination of the product lots for minimizing the statistical secondary optimization value, selecting product lots included in the selected one combination of the product lots as inspection-required product lots.

2. The method according to claim 1, further comprising the step of:

storing data on the selected inspection-required product lots in a data base and displaying the data on output means on the production line thereby to give an instruction for a product sampling inspection.

3. A program stored in a non-transitory storage medium for selecting inspection-required product lots a sampling inspection conducted at a time of production in such a manner as to minimize an expectation value of a number of steps for investigating material lots causing a defect of a product placed on the market, the program causing a computer to execute the steps of:

determining an amount of the product to be produced during a scheduled future period based on received order information;

calculating from design information the amount of materials required for the product scheduled for production;

preparing production plan information in which material lots used for each material are allotted to each lot of the product scheduled for production based on material stock information in accordance with a predetermined allotment rule;

accessing a number of the product lots to be inspected during the scheduled production period, and a user input which has a selected maximum value or average value as a statistical primary optimization value and a statistical secondary optimization value of the number of investigation-required material lots for every product lot; and assuming all conceivable combinations of the product lots for the number of inspection-required product lots of all product lots; and with regard to each combination;

extracting, as investigation-unrequired material lots, the material lots allotted to all inspection-required product lots which are included in the combination;

totalizing, for each product lot scheduled for production, the number of the allotted material lots other than the investigation-unrequired material lots specified in the preceding step as the number of investigation-required material lots; and calculating the maximum value or the average value of the number of investigation-required material lots as a statistical primary optimization value and the average value or maximum value of the number of investigation-required material lots as a statistical secondary optimization value for the number of the investigation-required material lots totalized in the preceding step; the program causing the computer to further execute the steps of:

selecting a combination of the product lots minimizing the statistical primary optimization value for the number of the investigation-required material lots for each product lot, as calculated for each of the combinations;

in the case where a plurality of corresponding combinations of the product lots are selected in the preceding step of selecting a combination of the product lots minimizing the statistical primary optimization value, further selecting a combination of the product lots for minimizing the statistical secondary optimization value among said plurality of corresponding combinations of the product lots; and in the case where only one combination of the product lots minimizing the statistical secondary optimization value is selected in the preceding step of further selecting a combination of the product lots for minimizing the statistical secondary optimization value, selecting product lots included in the selected combination of the product lots as an inspection-required product lots.

4. The program stored in a non-transitory storage medium according to claim 3, further comprising the step of:

storing data on the selected inspection-required product lots in a data base and displaying the data on output means on the production line thereby to give an instruction for a product sampling inspection.

* * * * *